United States Patent Office 3,305,762
Patented Feb. 21, 1967

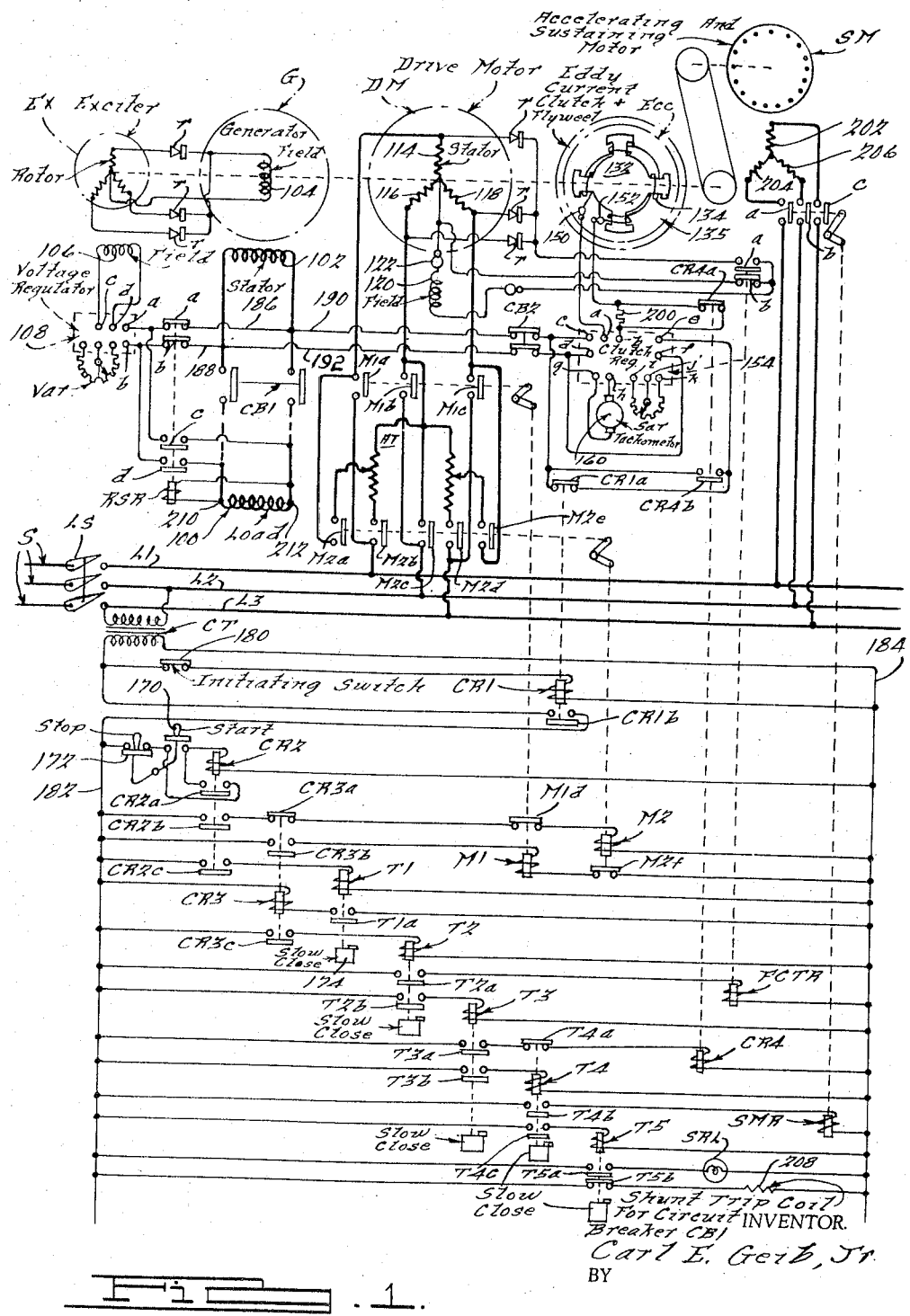

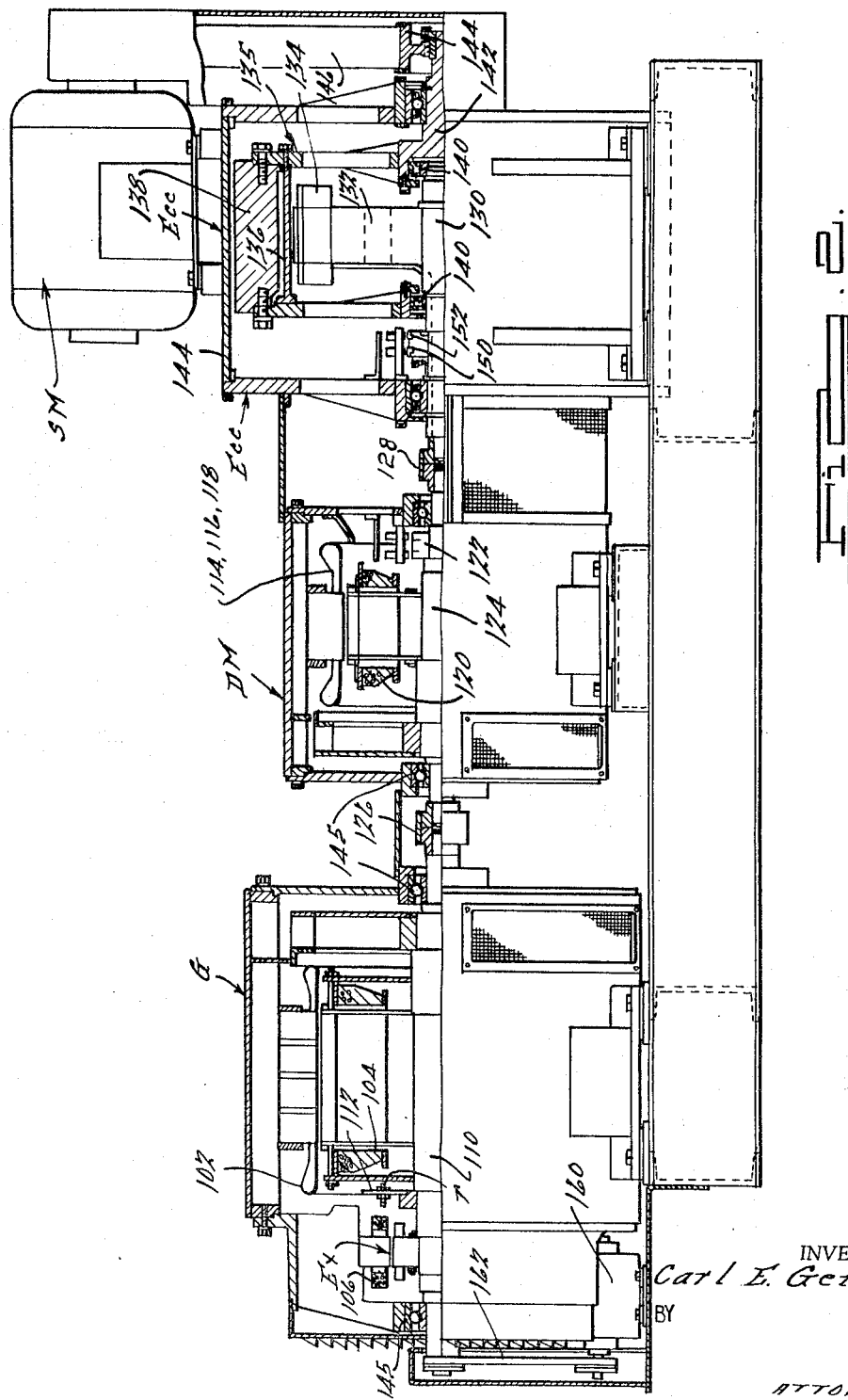

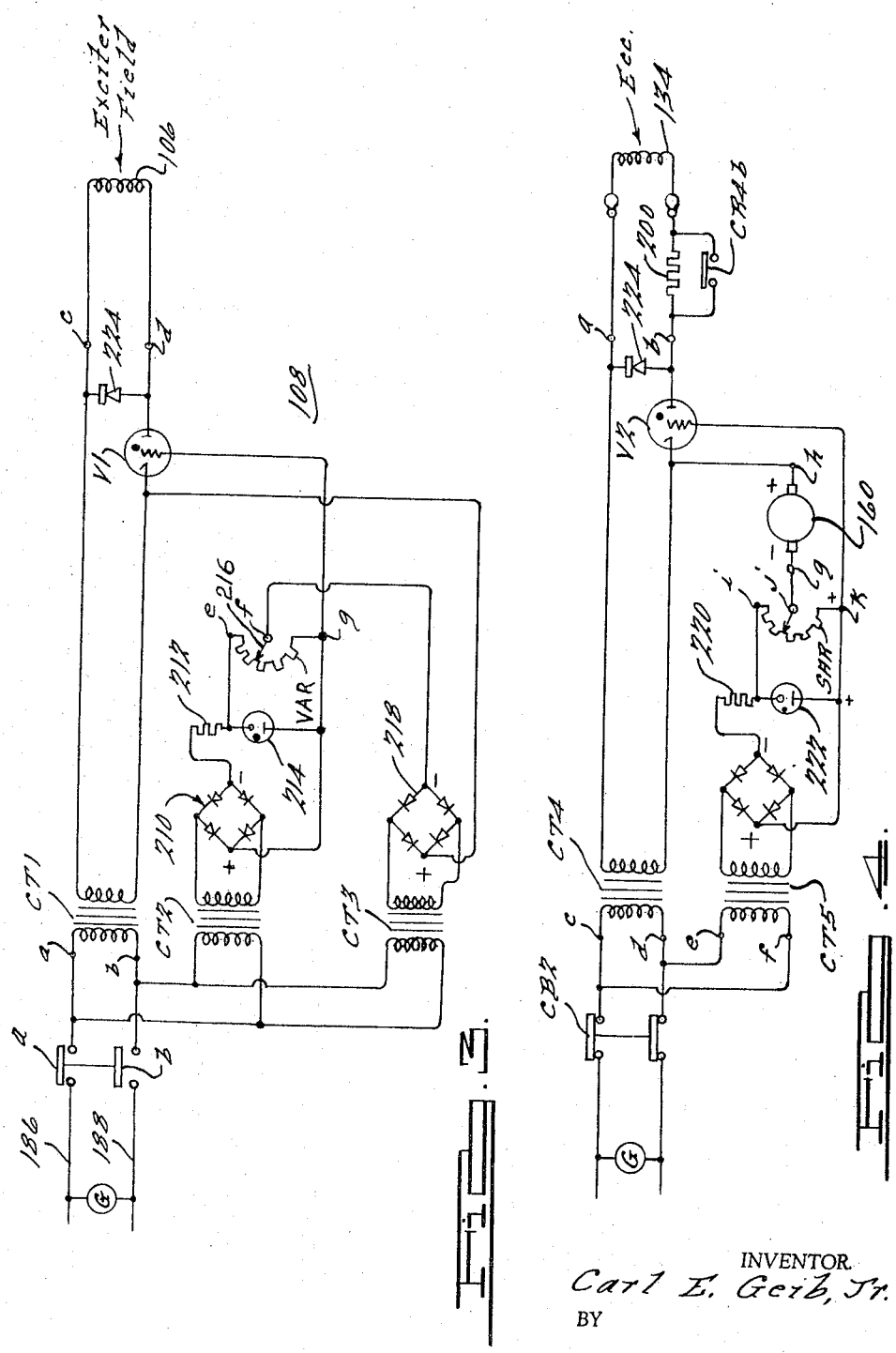

3,305,762
METHOD OF CONTROL OF ELECTRIC POWER
Carl E. Geib, Jr., Mansfield, Ohio, assignor to The Ideal Electric and Manufacturing Company, Mansfield, Ohio, a corporation of Ohio
Original application Oct. 17, 1962, Ser. No. 231,207, now Patent No. 3,196,341. Divided and this application July 19, 1965, Ser. No. 472,979
6 Claims. (Cl. 322—4)

This is a division of my application Serial No. 231,207, filed October 17, 1962, now Patent 3,196,341.

The present invention relates to an improved method for maintaining the supply of electrical energy to a load during all or part of the interruption of a normal supply of electrical energy. The term interruption is used broadly herein and includes, but is not limited to, a failure or deterioration or other undesired variation of some characteristic such as frequency or voltage, of a power source, or a disconnection from a power source caused either manually or automatically.

The improved methods of the present invention are applicable to a wide variety of situations. In certain of these situations it is sufficient if the load in question continues after interruption of the primary source of supply, to receive power at substantially the original voltage and frequency, for a comparatively short interval, ranging for example, from a few seconds to one or more minutes and then receives no further power and is shut down. In other applications it is desired, in the event of interruption of the primary source of electrical energy, to activate a standby prime mover such as a diesel engine. In such instances, in accordance with the present invention, the energy-storage system drives an electrical generator while a standby prime mover is being brought up to speed, and the standby prime mover thereafter drives the generator until the primary source of electrical energy is restored.

As compared to known power systems, so far as the present applicant is aware, and in a generic sense, a primary distinguishing characteristic of the present invention is that under normal conditions, energy is stored in an energy storage system in such quantity as to be capable of maintaining for a desired interval a normal rate of operation of a power supplying element, and upon interruption of a normal supply of energy the energy storage system is caused to act as a prime mover and gradually deliver energy to the power supplying element at such rate as to maintain substantially the normal rate of operation of the power supplying element throughout the interval. More particularly, and as specifically disclosed herein, energy is stored in a flywheel system by driving such system in rotation at a rate substantially in excess of the rate at which the aforesaid electric generator needs to be driven in order to supply energy to the load at the desired voltage and frequency. In the event of interruption of the original source of power, the flywheel is coupled to the generator through a precisely controlled transmission element, preferably a clutch of the eddy current type. During the interval that power is being taken from the flywheel system, the flywheel gradually slows down from its initially higher rate of rotation towards or to that rate of rotation (hereinafter referred to for convenience as "normal" speed) needed to cause the generator to deliver power at the required voltage and frequency and during this interval, throughout which "slippage" occurs between the generator and the flywheel system, the eddy current clutch or other transmission element is so controlled as to cause it to drive the generator at the normal speed.

The just mentioned primary distinguishing feature produces many important manufacturing and operating advantages. For example, depending upon the mass of the flywheel system and the degree to which its higher speed exceeds the normal speed of the generator, the interval throughout which the flywheel maintains the generator at normal speed and causes the latter to continue to supply the load with power at substantially the normal voltage and frequency, can be varied between relatively wide limits. This is of particular importance in those situations in which, in the event of interruption of a primary source of power a standby prime mover such as a diesel engine is started and brought up to speed and thereafter utilized, until normal service is restored, to drive a generator. In such situations the present system permits the diesel engine or other prime mover to be started and brought up to speed in normal fashion and by the use of usual starting devices, without at the same time requiring an excessively large flywheel and without experiencing any noticeable degradation of either the output voltage or frequency of the generator during the transfer interval.

In certain arrangements, one of which is specifically disclosed herein, the electric generator serves as the direct source of power for the load under normal conditions as well as under the aforesaid power-continuing conditions. In other arrangements, under normal conditions, power is delivered directly from the primary source to the load and also drives a synchronous alternator as a motor, causing it to float on the line and function as a synchronous condenser. In these latter arrangements, in accordance with the present invention, upon interruption of the primary sources of power, the alternator is coupled to and driven by the energy storage system, and while so driven operates as a generator and delivers power to the load. As illustrated herein also, structurally separate motors normally drive the generator and flywheel assembly, respectively, and the eddy current clutch delivers power to the generator only in the event of an interruption of the primary source of power. In a generic sense, the present improvements are also applicable to other general arrangements, as will be understood.

The nature and character of the preferred and other methods of the invention will be understood from the following description read in conjunction with the accompanying drawings, in which:

FIGURE 1 is a diagrammatic illustration of an electric power system capable of being employed in a way constituting a practice of the present invention;

FIG. 2 is a view and side elevation with certain of the parts shown in section, of an illustrative but preferred mechanical arrangement of the dynamo-electric elements utilized in the system of FIGURE 1; and, FIGS. 3 and 4 are diagrammatic views of illustrative regulating devices which may be used with the system of FIGURE 1.

Referring to FIGURES 1 and 2, an illustrative alternating current generator G is mechanically connected to and driven by an alternating current drive motor DM, which, under normal conditions, and through circuitry hereinafter described, receives power from an alternating current source S. Generator G may be of any suitable type but is illustrated as being a synchronous alternator of the revolving field type. As illustrated, generator G supplies, under both normal and power-continuing conditions, a single-phase load 100 and is consequently shown as provided with a single-phase stator winding 102. The field 104 of generator G receives power from an exciter Ex, which may be of any suitable type but is illustrated as being a conventional three-phase alternating current machine, the rotor winding whereof is connected through conventional rectifiers $r$ to the field winding 104 of the generator G. The exciter Ex has a field winding 106 which receives power through circuitry described below from the generator G under control of a conventional voltage regulator 108.

Referring particularly to FIGURE 2, generator G and exciter Ex will be recognized as a conventional brushless unit, the rotors of both machines being mounted on the same shaft 110 and rectifiers r being carried, though not shown, on a support 112 which also rotates with shaft 110.

Drive motor DM may also be of any suitable type but is illustrated as being a conventional revolving-field synchronous motor, the star connected stator windings 114, 116 and 118 whereof are arranged for connection through circuitry, described below, to line conductors L1, L2 and L3 of source S. The field winding 120 of motor DM is arranged for connection through slip rings diagrammatically indicated at 122 and additional rectifiers r to receive power from the source S through the stator windings 114, 116 and 118. The circuit for field winding 120 is controlled, as described below, by a field control contactor FCTR.

Referring particularly to FIGURE 2, the rotor shaft 124 of motor DM is connected through conventional couplings 126 and 128 respectively, to the generator shaft 110 and the shaft 130 of an eddy current clutch ECC. Clutch ECC may have any of a number of well known constructions but is illustrated as having a laminated, salient pole field structure carried on shaft 130 for rotation therewith, and comprising a plurality of poles 132 each whereof carries a winding 134. The field structure 132 is rotatable within and relative to a drum 135. Drum 135 is illustrated as having a smooth uninterrupted cylindrical inductor portion 136, the inner surface whereof lies immediately adjacent the pole faces of the field structure. In the preferred practice of the invention and as herein illustrated, the drum 135 also carries a massive outer ring member 138, of sufficient mass to enable the eddy current drum structure to serve as the flywheel of the present system. Drum 135 is supported on shaft 130, for rotation relative thereto, by conventional bearing assemblies 140, and is rigidly connected to a stub shaft 142 which, at its outer end, carries a sheave 144. As will be evident from FIGURE 2, shafts 110, 124, 130 and 142 are supported in usual bearing assemblies such as bearing assemblies 145.

Under normal conditions the drum of flywheel 135 is driven by an accelerating and sustaining motor SM. As shown in FIGURE 2, motor SM is stationarily carried on the housing 144 of the eddy current clutch structure ECC and is driven from stub shaft 142 through the aforesaid sheave 144 and belt 146.

The windings 134 of eddy current clutch ECC are illustrated in FIGURE 1 as being connected in series with each other and as connected through slip rings 150 and 152 to the output terminals a and b of a clutch regulator 154, the structure and characteristics of which are described in more detail below. Motor SM may also be of any suitable type but is illustrated as being a three-phase alternating current squirrel cage induction motor, the star-connected stator windings whereof are supplied, under control of contacts a, b and c of a usual mechanical contactor SMR, from the aforesaid source S.

It will be observed that any suitable mechanism may be utilized as a measure of the speed and, consequently, the output frequency of the generator. Preferably, and as illustrated, this is accomplished by a usual direct current tachometer generator 160 mounted at the left-hand end of the equipment as viewed in FIGURE 2, and driven from the generator shaft 110 through a belt 162.

Similarly, any suitable arrangement may be utilized to affect the starting and acceleration of the drive motor DM. As shown, at start, drive motor DM receives power at a reduced voltage from line conductors L1, L2 and L3 through an auto transformer AT under control of contacts M2a, M2b, M2c, M2d and M2e of a usual starting magnetic contactor M2. When the motor speed approaches its rated speed, contactor M2 is de-energized and motor DM is directly connected to line conductors L1, L2 and L3 through contacts M1a, M1b and M1c of running contactor M1.

Preferably, drive motor DM is provided with a squirrel cage starting winding. As described below, field winding 120 is shorted out during the acceleration period and is thereafter excited under control of field control relay FCTR.

Under normal conditions the starting and stopping of the system is under control of usual start and stop buttons 170 and 172, usual electromagnetic control relays CR1, CR2, CR3 and CR4, and timers T1, T2, T3, T4 and T5. Though they may be of any suitable type, timers T1–T5 are illustrated as being magnetic contactors or relays provided with dash pots 174 which delay, for desired adjustable intervals after energization of the coils thereof, the closing of the normally open contacts thereof and the opening of the normally closed contacts thereof.

The illustrated arrangement is one in which the stored-energy system is brought into play as a result of, or as an incident to, a disconnection of a prime mover, in this case drive motor DM, from its normal source of power, in this case the source S. The requirements of the illustrated embodiment are met, if after the disconnection, the generator G continues to supply power at substantially normal voltage and frequency to the load 100 for a desired interval, for example, 10 seconds at full load. In this instance no provision is made to continue operation of the generator at normal speed after the expiration of the just mentioned interval. The disconnection of the prime mover from its normal source of power may occur either manually or automatically, as will be understood, and is illustrated herein as being accomplished by opening a normally closed switch 180.

It is believed that the remaining electrical and mechanical details can best be understood from a description of the operation of the herein illustrated embodiment thereof. Before proceeding with this description it is noted that all electrical contacts are shown in the position occupied thereby under de-energized conditions of the associated operating coils or solenoids. Further, switch 180 is shown closed, which may be assumed to be the position occupied thereby at all times except when it is desired to bring the stored energy system into play. Finally, as illustrated, the system is at rest since conductors L1, L2 and L3 are disconnected from the source S at the now-open disconnect switch LS.

To condition the system for normal operation, disconnect switch LS may be closed, thereby energizing line conductors L1, L2 and L3. This action energizes the control transformer CT which, through switch 180, energizes the coil of control relay CR1 and causes it to open its contact CR1a and close its contact CR1b. The opening of contact CR1a is preparatory only, but closure of contact CR1b connects the secondary winding of control transformer CT to, and energizes, the two control busses 182 and 184.

To place the system in operation, start button 170 may be momentarily closed, which action completes an obvious energizing circuit for the winding of control relay CR2 which thereupon closes its contact CR2a–b–c. Closure of contact CR2a completes a selfholding circuit for relay CR2, enabling start button 170 to be reopened without effect. Closure of contact CR2b completes an energizing circuit through now closed contacts CR3a and M1d for the winding of starting contactor M2, which thereupon closes its contacts M2a–b–c–d–e and opens its contact M2f. The latter contact serves only an interlock function and prevents energization of the running contactor M1.

Closure of contacts M2b, c and d completes obvious input circuits for windings of the auto transformer AT and winding 116 of drive motor DM, and closure of contacts M2a and M2e connects the output terminals of transformer AT to the stator windings 114 and 118 of drive motor DM.

Under the conditions stated, contact b of field control relay FCTR is closed and, consequently, field winding 120 is not excited. However, as aforementioned, motor DM preferably contains a squirrel cage starting winding and consequently, upon energization of windings 114, 116 and 118, motor DM starts and accelerates and also starts and accelerates generator G, exciter Ex and the field structure 132 of eddy current clutch ECC. The length of the acceleration period of course depends upon the rating of the motor DM, the magnitudes of the masses involved in the complete rotating system, and the ratio between the input and output voltages of transformer AT. As an example, transformer AT might be set to produce an output voltage of from 60 to 70% of the full voltage of source S. As a further example, and since substantially no load is being supplied by generator G, drive motor DM might be expected to attain 95 to 97% of rated speed at the just mentioned reduced voltage.

At the expiration of an interval, adjustable as aforesaid, but sufficient to allow completion of the accelerating operation at reduced voltage, motor DM is disconnected from transformer AT and is directly connected to line conductors L1, L2 and L3. More particularly, the previously mentioned closure of contact CR2c of relay CR2 completed an obvious energizing circuit for the coil of the first timing relay T1, which thereupon initiated its closing action. At the expiration of the timing period of timing relay T1, which as an example might be from 20 to 25 seconds, contact T1a thereof closes. This completes an obvious energizing circuit for the coil of control relay CR3 which thereupon opens its contact CR3a and closes its contacts CR3b and CR3c.

The opening of contact CR3a interrupts the previously traced energized circuit for the coil of starting contactor M2 which thereupon resumes the illustrated position, restoring all contacts thereof to the illustrated position. At substantially the same time closure of contact CR3b completes an energizing circuit for the coil of the running contactor M1 which circuit also includes the now closed interlocked contact M2f of the starting contactor. It will be appreciated, of course, that mechanical interlocks may be used between contactors M1 and M2 as well as the illustrated electrical interlocks to insure the proper sequencing and timing relation between the reopening of the starting contactor and the energization of the running contactor.

Upon being energized, contactor M1 closes its contacts M1a–b–c and reopens its contact M1d. The latter action is without effect but the former action connects stator windings 114, 116 and 118 of motor DM directly across the line conductor L1, L2 and L3. Thus directly connected across the line, motor DM completes its acceleration to substantially its rated speed.

The closure of contact CR3c of control relay CR3 completes an obvious energizing circuit for the coil of the second timing relay T2 which thereupon initiates its closing action. The timing of relay T2 is set for an interval, for example 3 to 5 seconds, long enough to allow completion of the acceleration of motor DM to substantially its rated speed.

At the conclusion of its timing interval, timing relay T2 closes its contacts T2a and T2b. Closure of contact T2a completes an obvious energized circuit for the coil of the field control relay FCTR which thereupon closes its contact a and opens its contact b. The latter action interrupts the initially provided short circuit around field winding 120 of motor DM. Closure of contact a completes the previously mentioned excitation circuit for winding 120 and which includes the rectifiers r. Upon being thus supplied with direct current excitation, motor DM pulls into step and operates synchronously with the source at its rated speed.

Closure of timing relay contact T2b completes an obvious energizing circuit for timing relay T3 which provides an interval, for example 3 to 5 seconds, long enough to permit motor DM to complete the above synchronizing action and to permit the system to stabilize itself.

Before describing the action which results from the timing out of the third timing relay T3, it is noted that as the acceleration of the driving motor DM and, consequently, of the generator G and exciter Ex proceeds, the output voltage of stator winding 102 gradually rises. This gradually rising output voltage is impressed, through conductors 186 and 188 and the now closed contacts a and b of remote sensing relay RSR across the input terminals a and b of the voltage regulator 108. The output terminals c and d of regulator 108 are directly connected to the field winding 106 of the exciter Ex and, consequently, during the acceleration of generator G the exciter voltage also builds upon and progressively increases the excitation of the generator field winding 104.

Regulator 108 may be of any well known and conventional type which acts to increase or decrease the excitation of exciter field winding 106 to the degree needed to maintain the output voltage of stator winding 102 at a value which corresponds to the setting of a usual potentiometer VAR. Regulator 108 thus acts in a direction to increase the output voltage of generator G during the accelerating period, and, once generator G obtains substantially rated speed, regulator 108 is able to sufficiently influence the excitation of generator G to maintain the output voltage of the latter at substantially the desired value as determined by the setting of the adjusting element VAR of regulator 108.

Further, during the acceleration of generator G the progressively raising output voltage of stator winding 102 is impressed through conductors 190 and 192 and the normally closed protective circuit breaker CB2 across the power input terminals c and d of the clutch regulator 154. This action is without effect, since at the present stage of the starting up operation now being described, contacts CR1a and CR4b are both open end, consequently, the input control terminals e and f of regulator 154 are deenergized. Regulator 154 is of the type which under these conditions develops no voltage between its output terminals a and b.

Following the synchronizing of the drive motor DM, the flywheel system 135 is brought up to speed, in two stages. During the first stage, the field windings of the eddy current clutch ECC are partially excited, enabling drive motor DM to start and accelerate the flywheel structure 135 up to substantially the rated speed of drive motor DM.

More particularly, when timing relay T3 times out as aforesaid, it closes its contacts T3a and T3b. Closure of contacts T3a completes an obvious energizing circuit for the coil of control relay CR4 which thereupon opens its contact CR4a and closes its contact CR4b. Closure of contact CR4b connects the control input terminals e–f of regulator 154 to the generator G through conductors 190 and 192. An exemplary arrangement for regulator 154 is described in more detail below, but as in the case of regulator 108 it may be of any suitable type which, upon energization of its power and control input terminals c–d and e–f, develops an output voltage between its terminals a–b determined by the ratio between a reference voltage which may be set by its potentiometer SAR and a signal voltage impressed upon its input terminals g–h by the previously mentioned tachometer generator 160.

As will be understood, the output voltage at terminals a–b of regulator 154 causes current to flow through the field winding 134 of eddy current clutch ECC, which action causes this element to develop a torque determined by the magnitude of this exciting current.

In response to the development of the just mentioned torque, the drum and flywheel structure 135 of clutch ECC starts and accelerates towards rated speed of drive motor DM, at which speed the field structure 132 is now being driven by drive motor DM. Preferably and in order to avoid overloading drive motor DM during the just mentioned accelerating operation of drum and flywheel assembly 135 the excitation of windings 134 is kept at a low value. As shown, this is done by introducing resistor 200 into the circuit of windings 134. This is accomplished by the previously mentioned opening of contact CR4a of relay CR4.

At the expiration of an interval, for example 25 to 30 seconds, set long enough to permit the driving motor to bring the drum and flywheel structure and the accelerating and sustaining motor SM substantially up to rated speed of the drive motor, the excitation of the eddy current clutch is again cut off and the motor SM is energized and caused to complete the acceleration of the drum and flywheel assembly to its full value, which might for example be 1800 r.p.m. in a system employing a drive motor and generator rated at 1200 r.p.m.

More particularly, the previously mentioned closure of contact T3b of timing relay T3 completed an obvious energizing circuit for the winding of timing relay T4 which thereupon initiated an opening action of its contact T4a and initiated a closing action of its contacts T4b and T4c. These timing actions are completed at the end of the aforementioned period, for example, 25 to 30 seconds. Upon being opened, contacts T4a interrupt the previously traced energizing circuit for the coil of relay CR4 which thereupon resumes the illustrated position, reclosing contact CR4a and reopening contact CR4b. The former action is preparatory only but the opening of contact CR4b de-energizes the control input terminals e–f of regulator 154 thereby reducing the output voltage at terminals a–b to zero and cutting off the excitation to the windings 134 of the eddy current clutch ECC and reducing to zero the torque developed thereby.

Closure of contact T4b of timing relay T4 completes an obvious energizing circuit for the winding of contactor SMR which thereupon closes its contacts a–b–c and energizes the stator windings 202, 204 and 206 of accelerating and sustaining motor SM. Under the conditions stated the flywheel and drum assembly 134 is running freely with respect to the field structure 132 of the eddy current clutch ECC and, consequently, upon being supplied with power, motor SM is enabled to accelerate the drum and flywheel assembly 135 to the rated speed of motor SM, which as aforesaid might be 1800 r.p.m. in a system utilizing a motor-generator unit returned at 1200 r.p.m.

Closure of timing contact T4c completes an obvious energizing circuit for the remaining timing relay T5 which thereupon initiates a closing action of its contact T5a and an opening action of its contact T5b. Relay T5 is set for an interval, for example 25 to 30 seconds, which is long enough to enable motor SM to bring the drum and flywheel assembly up to the rated speed of motor SM. At the conclusion of this period contacts T5a close and as shown complete a circuit for a lamp SRL which thereupon lights and indicates to the operator that the starting up operation has been completed and that the system is in readiness to supply the load 100. As shown, the opening of contact T5b of relay T5 interrupts a circuit for an element 208 which if desired may be arranged to permit or produce the connection of the generator G to the load 100 or provide other signal or control functions. As illustrated, element 208 is the shunt trip coil for the main circuit breaker CB1, it being understood that breaker CB1 may be of any suitable manually or automatically closed type, closure whereof cannot be accomplished so long as coil 208 is energized.

Continuing with the operation now being described, if it is now desired to supply power to the load 100, breaker CB1 is closed, thereby connecting the load terminals 210 and 212 across stator winding 102 of generator G and enabling the latter to furnish electrical energy to the load 100. Closure of breaker CB1 also completes an obvious energizing circuit for the winding of the remote sensing relay RSR which thereupon opens its normally closed contacts a–b and closes its normally opened contacts c–d. This action, as will be understood, enables regulator 108 to sense voltage conditions at the load and thus eliminates the effect of line drops that may occur along the conductors interconnecting the generator and the load.

Closure of circuit breaker CB1 thus puts the system into what has been referred to herein as normal operation during which drive motor DM drives generator G at its rated normal speed, for example 1200 r.p.m., and establishes a corresponding frequency for the output of generator G. Under these conditions also, regulator 108 continually senses the voltage at the load 100 and adjusts the excitation of the generator field winding 104 in such manner as to maintain the just mentioned voltage at substantially the desired normal value.

Coming now to a description of the action of the stored-energy system, in maintaining generator G in operation at its normal speed for a desired interval after interruption of the supply of power to the drive motor DM, it may be assumed that the initiating switch 180 is caused to open and this action as aforesaid may occur either manually or automatically.

The opening of switch 180 interrupts the energizing circuit for the coil of relay CR1 which thereupon reopens its contact CR1b and recloses its contacts CR1a. It is believed to be evident that the reopening of contact CR1b de-energizes the control busses 182 and 184, thereby de-energizing the windings of all then-energized control and timing relays and of the running contactors M1 and SMR. De-energization of the control and timing relays performs no function except to put the associated circuits in readiness for the next starting up operation. De-energization of contactors M1 and SMR disconnects the drive motor DM and the accelerating and sustaining motor SM from the source S.

Substantially simultaneously with the de-energization of motors DM and SM, contact CR1a of control relay CR1 completes its closure and reconnects the control input terminals e–f of regulator 154 to the generator G, again causing voltage to appear between terminals a–b of this regulator and again exciting the windings 134 of the eddy current clutch and causing the latter to develop a substantial torque tending to cause the drum and flywheel structure 135 and the field structure 132 to rotate together. As aforesaid, the voltage at terminals a–b of regulator 154 is governed by the relationship between a reference voltage determined by the setting of potentiometer SAR and a signal voltage determined by the tachometer generator 160. The reference voltage, of course, corresponds to the rated or normal speed of the generator and the signal voltage corresponds to the actual speed of the generator.

With the drum and flywheel assembly 135 operating at a speed in excess of the rated speed of the generator, any torque developed in the eddy current clutch ECC of course tends to accelerate generator G to a speed in excess of its normal speed. It will be understood that regulator 154 is quite sensitive and that any increase in the speed of generator G causes the signal voltage to increase and alter the ratio between the signal and reference voltages in such a direction as to reduce the excitation of the eddy current windings 134. On the other hand, the load being supplied by generator G imposes a substantial decelerating force on generator G, tending to cause its speed to fall below normal speed. Any such reduction in speed of generator G causes the signal voltage of tachometer generator 160 to reduce, thereby altering the ratio between the signal and control voltages in such a direction as to increase the excitation of the eddy current windings 234, which, in turn, increases the torque developed in this unit and tends to accelerate the generator to a speed equal to or above its normal speed.

So long, accordingly, as the drum and flywheel assembly 135 operates at a speed in excess of the normal speed of generator G, regulator 154 acts to increase or decrease the excitation of the eddy current clutch windings 134 and thereby maintains the speed of generator G at substantially its normal value. It will be understood that the time constants involved in the regulator and in the eddy current clutch are comparatively short and that, consequently, the corrective changes in eddy current torque occur very rapidly. In consequence of this, the speed of generator G remains very close to its normal speed throughout the decelerating period of the flywheel structure. It will be understood also that the length of the decelerating period depends upon the load being supplied by the generator, the relative magnitudes of the several rotating masses and the degree to which the initial higher speed of the flywheel structure exceeds the normal speed of the generator. In a typical case, utilizing a 30 kw. generator and a 50 H.P. drive motor operating at 1200 r.p.m., and a flywheel system operating at 1800 r.p.m. and having at that speed a kinetic energy of 6,140,800 foot pounds, a decelerating interval at full generator load of 10 seconds or more is readily available.

It will be appreciated that, in the illustrated embodiment, once the speed of the flywheel assembly falls below the rated speed of the generator, excitation of the eddy current clutch remains at a maximum and the entire rotating system decelerates together and ultimately comes to rest. When this has occurred, and assuming that the initiating switch 180 has been reclosed, the system may be started up and put into normal operation in the previously described manner and any further operation of switch 180 again produces the same action as is described above.

As previously mentioned, regulator 108 may be of any well known structure. A suitable such structure is shown in simplified diagrammatic form in FIGURE 3 in which reference characters correspond to those appearing in FIGURE 1.

Referring to FIGURE 3, input terminals $a$ and $b$ are connected to the primary winding of a transformer CT1, the secondary winding whereof is directly connected through a usual triode V1 to the field winding 106 of the exciter. Triode V1 may be of any suitable type but is preferably of the gas filled, discontinuous control type known as a thyratron.

To provide a reference voltage, independent of variations in voltage at terminals $a-b$, conductors 186 and 188 also supply a second control transformer CT2 the output whereof is rectified by conventional rectifier 210 and impressed across a usual regulating circuit comprising a resistor 212 and a diode 214 of the glow discharge type. It will be appreciated that upon the application to it of a voltage in excess of a predetermined amount diode 214 becomes conducting. Under such conditions, as is well known, the current passed by diode 214 varies with the voltage impressed across it and resistor 212 but the voltage drop across diode 214 remains substantially constant. This substantially constant voltage is applied to the input terminals $e$ and $g$ of the adjusting potentiometer VAR and, consequently, the potential of terminal $f$ thereof can be set as desired by adjustment of the movable contact 216.

To provide a signal voltage, continuously proportional to the voltage at terminals $a-b$, conductors 186 and 188 supply a third transformer CT3, the output whereof is rectified by a conventional rectifier 218.

The just mentioned reference and signal voltages are applied, in opposed relation, between the cathode and grid of thyratron V1 (which may, of course, be provided with any conventional additional grid biasing circuitry), so that the points in successive half cycles of like polarity, at which valve V1 becomes conducting, and consequently the average current conducted thereby, is governed by the relation between the two opposed reference and signal voltages.

Similarly, and as previously indicated, the eddy current clutch regulator 154 may be of any suitable well known construction. A suitable structure is shown in simplified diagrammatic form in FIGURE 4 in which reference characters correspond to those appearing in FIGURE 1.

Referring particularly to FIGURE 4 the output of generator G is applied to input terminals $c-d$ and $e-f$. Terminals $c-d$ are connected to the primary winding of a control transformer CT4, the secondary winding whereof is connected to the field windings 134 of the eddy current clutch ECC through triode V2 which may be and preferably is like triode V1. As described in connection with FIGURE 1, this circuit also includes resistor 200 and the normally closed contacts CR4b of the previously described control relay CR4.

Input terminals $e-f$ supply a control transformer CT5 the output whereof is rectified and applied across the circuit comprising resistor 220 and discharge device 222. As in the case of FIGURE 3, discharge device 222 maintains the voltage drop thereacross at a substantially uniform value, independent of variations in the output voltage of transformer CT5, and this substantially uniform voltage is applied across terminals $i-k$ of the adjusting device SAR to provide a desired adjustable reference voltage. In this instance, the signal voltage is derived directly from tachometer generator 160. The opposed reference and signal voltages are applied between the cathode and grid of valve V2 and, as in FIGURE 3, the relationship therebetween determines the points in successive half cycles of like polarity at which valve V2 becomes conducting.

Conventional transient suppressors 224 are shown in each of FIGURES 3 and 4 and it will be appreciated that similar and other conventional circuit refinements may be used as desired in the systems of FIGURES 1, 3 and 4. Such refinements have been eliminated from the present drawings in the interest of simplicity and as not being necessary to an understanding of the present invention.

What is claimed is:

1. The method of supplying, during the continuation of the normal supply of electrical energy, mechanical energy to a rotatable electrical generator to drive that rotatable electrical generator at a preselected rotational velocity and to a rotatable mass to drive that rotatable mass at a selected rotational velocity in preparation for subsequently delivering mechanical energy from the mass to the generator upon the interruption of the normal supply of electrical energy which comprises the steps of delivering mechanical energy from a limited-capacity source of mechanical energy to the generator substantially to accelerate the generator to said preselected speed, and thereafter initiating the delivery of energy from that same limited-capacity source to said rotatable mass to accelerate said mass.

2. The method of supplying, during the continuation of the normal supply of electrical energy, mechanical energy to a rotatable electrical generator to drive that rotatable electrical generator at a preselected rotational velocity and to a rotatable mass to drive that rotatable mass at a higher effective rotational velocity in preparation for subsequently delivering mechanical energy from the mass to the generator upon the interruption of the normal supply of electrical energy which comprises the steps of delivering mechanical energy from a limited-capacity source of mechanical energy to the generator to accelerate the generator substantially to said preselected speed, thereafter initiating the delivery of energy from that same limited-capacity source to said rotatable mass to accelerate said mass to an effective velocity aproximately equal to said preselected velocity, and thereafter delivering energy to accelerate said mass to said higher effective rotational velocity.

3. The method of supplying, during the continuation of the normal supply of electrical energy, mechanical energy to a rotatable electrical generator to drive that rotatable electrical generator at a preselected rotational velocity and to a rotatable mass to drive that rotatable mass at a higher effective rotational velocity in preparation for subsequently delivering mechanical energy from the mass to the generator upon the interruption of the normal supply of electrical energy which comprises the steps of delivering mechanical energy from a limited-capacity source of mechanical energy to the generator substantially to accelerate the generator to said preselected speed, thereafter initiating the delivery of energy from that same limited-capacity source to said rotatable mass to accelerate said mass to an effective velocity approximately equal to said preselected velocity, and thereafter delivering energy from a different source of mechanical energy to accelerate said mass to said higher effective rotational velocity.

4. In a method of developing and supplying mechanical driving power from a rotating mass to a rotatable electrical generator to drive the generator for an interval at a preselected rotational speed, the steps of applying rotational energy from a high-torque accelerating source to the mass to rotationally accelerate the mass from rest towards a rotational velocity substantially equal to the said preselected velocity, effectively disconnecting the mass from the high-torque accelerating source, and applying rotational energy from a separate lower-torque accelerating source to the mass to accelerate the mass to a rotational velocity substantially greater than said preselected velocity until the beginning of the said interval.

5. In a method of developing and supplying mechanical driving power from a rotating mass to a rotatable electrical generator to drive the generator for an interval at a preselected rotational velocity, the steps of gradually applying rotational energy from a high-torque accelerating source rotating substantially at a selected rotational speed to an initially effectively stationary mass to gradually rotationally accelerate the mass from rest towards an effective rotational velocity substantially equal to said selected rotational speed, effectively disconnecting the mass from the high-torque accelerating source, and applying rotational energy from a separate lower-torque accelerating source to the mass to accelerate said mass to a rotational velocity substantially greater then said preselected velocity and substantially greater than said selected rotational speed until the beginning of the said interval.

6. In a method of supplying mechanical driving power from a rotating mass to a rotatable electrical generator to drive the generator for an interval at a preselected rotational velocity, the steps of applying rotational energy from a high-torque accelerating source both to the mass and to a de-energized separate lower-torque accelerating source to rotationally accelerate both the mass and said lower-torque accelerating source from rest towards an effective rotational velocity substantially greater than the said preselected velocity, effectively disconnecting the mass and the lower-torque accelerating source from the high-torque accelerating source, thereafter applying rotational energy from the lower-torque accelerating source to the mass to maintain the rotational velocity of said mass at said effective rotational velocity, and terminating the application of rotational energy to said mass from the lower-torque accelerating source at the commencement of said interval.

References Cited by the Examiner
UNITED STATES PATENTS

| | | | |
|---|---|---|---|
| 2,920,211 | 1/1960 | Gotoh | 290—4 |
| 3,178,632 | 4/1965 | Woodson | 322—4 |
| 3,196,341 | 7/1965 | Geib | 322—4 |

JOHN F. COUCH, *Primary Examiner.*

LLOYD McCOLLUM, *Examiner.*

W. A. BEHA, *Assistant Examiner.*